Oct. 8, 1946.  J. H. MILLER  2,408,944
EXPOSURE METER
Filed Aug. 14, 1944
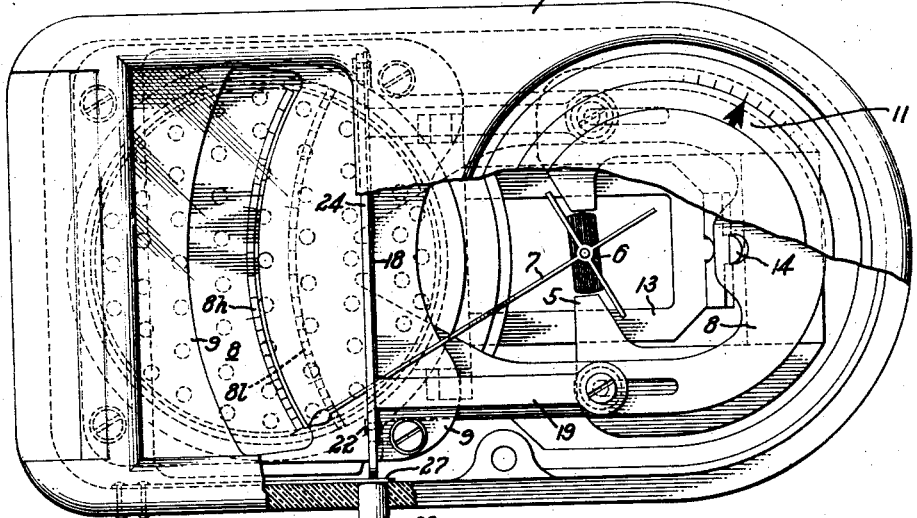
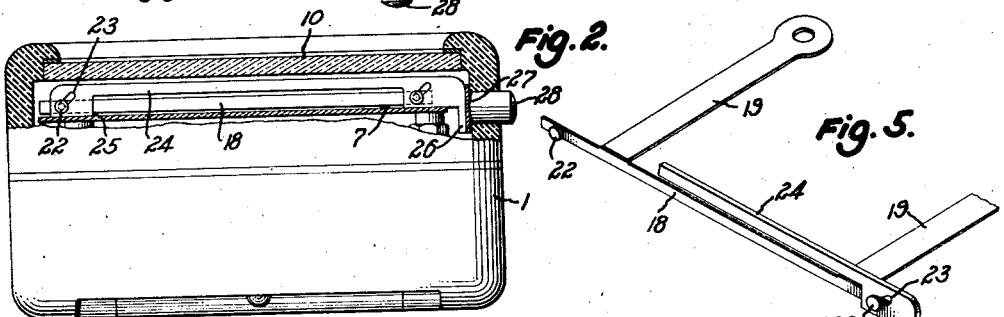
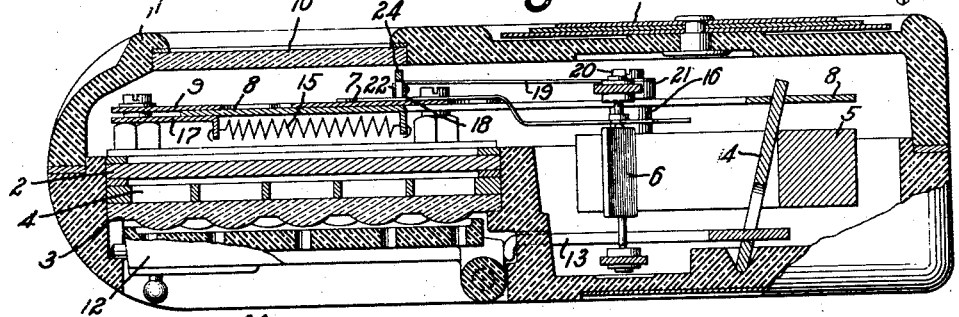
Inventor:
John H. Miller,
by Pierce + Scheffler,
Attorneys.

Patented Oct. 8, 1946

2,408,944

UNITED STATES PATENT OFFICE 2,408,944

EXPOSURE METER

John H. Miller, Short Hills, N. J., assignor to Weston Electrical Instrument Corporation, Newark, N. J., a corporation of New Jersey Application August 14, 1944, Serial No. 549,446

3 Claims. (Cl. 88—23)

This invention relates to exposure meters and more particularly to exposure meters of the type including a current-generating photocell and a milliammeter forming a brightness meter, and a mechanical calculator for correlating the measured scene brightness with other exposure factors to determine appropriate exposure conditions.

One of the commercial designs for such exposure meters makes the measuring instrument scale a part of the calculator, and another calculator element is adjusted to set a mark or a selected exposure factor value in line with the pointer position during the taking of a brightness reading. Alternatively, the operator may memorize the reading and adjust the other calculator element after the reading is completed and the pointer has returned to zero position. In the other commercial design, the measuring instrument and the calculator are mechanically independent and the operator must memorize the reading and then set a calculator element to that measured value.

The present invention contemplates an exposure meter that eliminates the adjustment of the calculator during the measurement of the scene brightness, and also eliminates the mental step of memorizing the brightness reading.

An object of the invention is to provide an exposure meter in which a measured brightness value is recorded for a desired interval by retaining the instrument pointer in the position which it takes during a brightness measuring operation. An object is to provide a brightness meter in which the moving system and pointer are normally restrained from movement by a depressor bar that is lifting momentarily when a reading is to be taken. More specifically, an object is to provide a photoelectric exposure meter in which a spring-pressed depressor bar and a release bar extend transversely over the scale plate assembly, the release bar being movable by a push button to lift the depressor bar from the pointer when a reading is to be taken.

These and other objects and advantages of the invention will be apparent from the following specification when taken with the accompanying drawing in which:

Fig. 1 is a plan view, with parts broken away, of an exposure meter embodying the invention;

Fig. 2 is an end view with parts broken away to show the pointer clamping mechanism in elevation;

Fig. 3 is a longitudinal central section through the exposure meter;

Fig. 4 is a fragmentary sectional view, on a larger scale, of the pointer and clamping mechanism; and Fig. 5 is a fragmentary perspective view of the clamping mechanism.

The invention has been illustrated as embodied in an exposure meter of the type in which the measuring instrument and the calculator are mechanically independent, but it will be apparent that the invention may be incorporated in the other general type of exposure meter in which the instrument scale is a part of the calculator. The illustrated exposure meter is of the double range type such as shown in Patent No. 2,274,441, Alexander T. Williams, and reference is made to that patent for a more detailed explanation of the construction and method of operation of the double range meter.

In the drawing, the reference numeral 1 identifies the relatively flat and elongated casing which houses a barrier layer type of photoelectric cell 2, a main or permanently operative light-restricting system comprising a multiple lens plate 3 and multiple compartment member 4, and a measuring instrument comprising a permanent magnet 5, moving coil 6 and pointer 7. The pointer moves over a longitudinally slidable plate 8 having a high range graduated scale $8h$ and a low range graduated scale $8l$ that may be exposed to view, alternatively and in accordance with the adjustment of the plate 8, through an opening in an overlying stationary plate 9 and the cover glass 10 of a window opening in the casing 1. The measured values of brightness are evaluated with other exposure factors by means of a calculator 11 that is mounted on the casing 1 adjacent the window opening.

A range-changing baffle 12 is pivotally mounted on the casing 1 for movement into position to overlie or to be spaced from the lens plate 3, and the graduated scale plate 8 is shifted in accordance with the position of the auxiliary baffle 12 by a linkage including a slide 13 and lever 14, and a spring 15. The rear portion of the plate 8 is slidably supported on studs 16 threaded into the magnet 5, and the forward portion is supported by a stationary plate 17 secured to the studs on which the cover plate 9 of the scale assembly is mounted.

The specific details of the exposure meter as so far described are not essential to the present invention which contemplates a normally operative, and manually releasable, clamp for preventing angular displacement of the moving system of the brightness measuring instrument. A depressor or clamp bar 18 is arranged above and normally pressed downwardly upon the pointer 7 by its integral spring arms 19 that are supported on the studs 16 by screws 20 and spacing washers 21. The bar 18 and arms 19 are preferably formed as a U-shaped punching from thin sheet metal with the bar bent over at right angles to the plane of the arms 19. The clamp bar 18 extends transversely of the casing 1 and has studs 22 fixed thereto that extend through inclined slots 23 in a release bar 24 to support the release bar for sliding movement against and parallel to the clamp bar. The central portion of the release bar 24 is elevated above the path of pointer movement by the end legs 25 that rest upon the plate 9 of the scale assembly. An extension 26 at one end of the bar 24 rests against a leaf spring 27 that is secured to the casing 1 and carries a push button 28 that extends through the casing.

The clamp bar 18 is pressed downwardly by the spring arms 19 to clamp the pointer 7 against the plate 9 of the scale assembly, and the release bar 24 is thereby retained in inoperative position towards the right, as seen in Fig. 2, by the pressure exerted on the lower walls of the slots 23 by the studs 22. The push button 28 is pressed inwardly when a brightness reading is to be taken, thereby displacing the release bar 24 towards the left, Fig. 2, to lift the clamp bar 18 as the inclined walls of slots 23 move under the studs 22 of the bar 18, see Fig. 4. The push button 28 is released when the pointer has moved along the graduated scale, and the push button is returned to its inoperative position by the leaf spring 27. The spring arms 19 then force the clamp bar 18 downwardly to engage the pointer 7, and the release bar 24 is returned to inoperative position by this movement of the clamp bar 18.

The brightness reading is recorded by the clamping of the pointer 7, and the measured value is set on the computer 11 to determine the exposure data. This "freezing" of the brightness measurement reduces the possibility of error in the setting of the computer and it is particularly useful in affording a final check when there has been some delay after the measurement of brightness or when the illumination is varying rapidly. A quick check on the camera setting may be had by directing the exposure meter towards the scene and watching the pointer movement when the button 27 is depressed. If there is little or no movement of the pointer, the operator knows that the scene brightness did not change materially after the initial brightness reading. On the other hand, a substantial pointer movement on the check reading indicates that the scene brightness has changed and that a new computation of exposure data is required.

It is to be understood that the invention is not limited to the particular embodiment herein shown and described as the design and construction of the elements for retaining the instrument pointer at its measured reading may be varied considerably in an exposure meter as herein illustrated or of other design without departing from the spirit of my invention as set forth in the following claims.

I claim:

1. In a photoelectric exposure meter of the calculator type, the combination with a photocell, a light baffle, and an instrument connected to said photocell, said instrument including a moving system for displacing a pointer over a scale plate in accordance with the light energy incident upon said photocell, of a depressor bar, spring means yieldingly pressing said depressor bar upon said pointer to clamp the same to the scale plate, and manually actuated means for lifting said depressor bar to free said pointer for displacement by said moving system; said manually actuated means comprising a release bar slidable along said depressor bar, and pin-and-slot means connecting said depressor bar and said release bar.

2. In a photoelectric exposure meter of the calculator type and including an instrument having a moving system for displacing a pointer over a scale plate in accordance with the average scene brightness, mechanism comprising a depressor bar and a release bar arranged transversely of the path of said pointer and slidably connected by pins on one bar extending through inclined slots on the other bar, spring means urging said depressor bar into engagement with said pointer, and manually operable means for sliding said release bar to lift said depressor bar from the pointer.

3. In a photoelectric exposure meter, the invention as recited in claim 2, wherein said depressor bar and said spring means comprise a unitary U-shaped punching from sheet metal, the bar being bent at right angles to the plane of the spring means.

JOHN H. MILLER.